United States Patent [19]

Pribnow

[11] Patent Number: 5,327,550
[45] Date of Patent: Jul. 5, 1994

[54] DISABLED MEMORY SECTIONS FOR DEGRADED OPERATION OF A VECTOR SUPERCOMPUTER

[75] Inventor: Richard D. Pribnow, Chippewa Falls, Wis.

[73] Assignee: Cray Research, Inc., Eagan, Minn.

[21] Appl. No.: 618,685

[22] Filed: Nov. 27, 1990

[51] Int. Cl.$^5$ .............................................. G06F 13/18
[52] U.S. Cl. ................................. 395/575; 371/11.1; 371/10.2
[58] Field of Search ............... 395/575, 650; 371/11.1, 371/10.2

[56] References Cited

U.S. PATENT DOCUMENTS

| | | | |
|---|---|---|---|
| 4,128,880 | 12/1978 | Cray, Jr. | 364/200 |
| 4,503,535 | 3/1985 | Budde et al. | |
| 4,636,942 | 1/1987 | Chen et al. | 364/200 |
| 4,661,900 | 4/1987 | Chen et al. | 364/200 |
| 4,745,545 | 5/1988 | Schiffleger | 364/200 |
| 4,754,398 | 6/1988 | Pribnow | 364/200 |
| 4,757,474 | 7/1988 | Fukushi et al. | 365/189 |
| 4,884,194 | 11/1989 | Krol et al. | 395/575 |
| 5,142,638 | 8/1992 | Schiffleger | 395/425 |
| 5,148,540 | 9/1992 | Beardsley et al. | 395/575 |
| 5,201,053 | 4/1993 | Benhase et al. | 395/725 |

OTHER PUBLICATIONS

Patent Abstracts of Japan, vol. 13, No. 200 (P-869) May 12, 1989 & JP,A,1 021 564 (Fujitsu Ltd.) Jan. 24, 1989.
Proceedings of the 1986 IBM Europe Institute Seminar on Parallel Computing, Aug. 11-15, 1988 pp. 149-163, North-Holland, Amsterdam, NL; E. Maehle: "Multiprocessor Testbed Dirmu 25: Efficiency and Fault Tolerance" see p. 158, line 10 p. 161, line 22; FIGS. 2, 9, 10.
Proceedings of the International Conference on Parallel Processing, Aug. 17-21, 1987, pp. 885-888, Pennsylvania State Univ. Press, London, GB; V. Cherkassky et al.: "Graceful Degradation of Multiprocessor Systems" see p. 885, left column, line 49-p. 886, right column, line 42; FIGS. 1,2.

*Primary Examiner*—Robert W. Beausoliel, Jr.
*Assistant Examiner*—Ly V. Hua
*Attorney, Agent, or Firm*—Daniel J. Kluth

[57] ABSTRACT

Maintenance modes of operation of a multiprocessing vector supercomputer system are disclosed. The modes allow diagnostics to run on a failed portion of the system while simultaneously allowing user tasks to run in a degraded performance mode. This is accomplished by assigning a processor or a group of processors to run diagnostics on an assigned portion of memory, while the operating system and user tasks are run in the remaining processors in the remaining portion of memory. In this manner, the diagnostics can isolate the problem without requiring complete shut down of the user task, while at the same time protecting the integrity of the operating system. The result is significantly reduced preventive maintenance down time, more efficient diagnosis of hardware failures, and a corresponding increase in user task run time.

13 Claims, 6 Drawing Sheets

DISABLED MEMORY SECTIONS FOR DEGRADED OPERATION OF A VECTOR SUPERCOMPUTER

FIELD OF THE INVENTION

The present invention pertains generally to the field of multiprocessor supercomputer systems, and more particularly to maintenance modes of operation designed to reduce the down time of multiprocessor supercomputers.

BACKGROUND OF THE INVENTION

Many scientific data processing tasks involve extensive arithmetic manipulation of ordered arrays of data. Commonly, this type of manipulation or "vector" processing involves performing the same operation repetitively on each successive element of a set of data. Most computers are organized with one central processing unit (CPU) which can communicate with a memory and with input-output (I/O). To perform an arithmetic function, each of the operands must be successively brought to the CPU from memory, the functions must be performed, and the result returned to memory. However, the CPU can usually process instructions and data faster than they can be fetched from the memory unit. This inherent memory latency results in the CPU sitting idle much of the time waiting for instructions or data to be retrieved from memory. Machines utilizing this type of organization, i.e. "scalar" machines, have therefore been found too slow and hardware inefficient for practical use in large scale vector processing tasks.

In order to increase processing speed and hardware efficiency when dealing with ordered arrays of data, "vector" machines have been developed. A vector machine is one which deals with ordered arrays of data by virtue of its hardware organization, thus attaining a higher speed of operation than scalar machines. One such vector machine is disclosed in U.S. Pat. No. 4,128,880, issued Dec. 5, 1978 to Cray, which patent is incorporated herein by reference.

The vector processing machine of the Cray patent is a single processor machine having three vector functional units specifically designed for performing vector operations. The Cray patent also provides a set of eight vector registers. Because vector operations can be performed using data directly from the vector registers, a substantial reduction in memory access requirements (and thus delay due to the inherent memory latency) is achieved where repeated computation on the same data is required.

The Cray patent also employs prefetching of instructions and data as a means of hiding inherent memory latencies. This technique, known as "pipelining", involves the prefetching of program instructions and writing them into one end of an instruction "pipe" of length n while previous instructions are being executed. The corresponding data necessary for execution of that instruction is also fetched from memory and written into one end of a separate data pipeline or "chain". Thus, by the time an instruction reaches the read end of the pipe, the data necessary for execution which had to be retrieved from memory is immediately available for processing from the read end of the data chain. By pipelining instructions and chaining the data, then, most of the execution time can be overlapped with the memory fetch time. As a result, processor idle time is greatly reduced, and processing speed and efficiency in large scale vector processing tasks is greatly increased.

Computer processing speed and efficiency in both scalar and vector machines can be further increased through the use of multiprocessing techniques. Multiprocessing involves the use of two or more processors sharing system resources, such as the main memory. Independent tasks of different jobs or related tasks of a single job may be run on the multiple processors. Each processor obeys its own set of instructions, and the processors execute their instructions simultaneously ("in parallel"). By increasing the number of processors and operating them in parallel, more work can be done in a shorter period of time.

An example of a two-processor multiprocessing vector machine is disclosed in U.S. Pat. No. 4,636,942, issued Jan. 13, 1987 to Chen et al., which patent is incorporated herein by reference. Another aspect of the two-processor machine of the Chen '942 patent is disclosed in U.S. Pat. No. 4,661,900, issued Apr. 28, 1987 to Chen et al., which patent is incorporated herein by reference. A four-processor multiprocessing vector machine is disclosed in U.S. Pat. No. 4,745,545, issued May 17, 1988 to Schiffleger, and in U.S. Pat. No. 4,754,398, issued Jun. 28, 1988 to Pribnow, both of which are incorporated herein by reference. All of the above named patents are assigned to Cray Research, Inc., the assignee of the present invention.

Another multiprocessing vector machine from Cray Research, Inc., the assignee of the present invention, is the Y-MP vector supercomputer. A detailed description of the Y-MP architecture can be found in the co-pending and commonly assigned U.S. Pat. No. 5,142,638, issued Aug. 25, 1992, entitled "MEMORY ACCESS CONFLICT RESOLUTION SYSTEM FOR THE Y-MP" which application is incorporated herein by reference. In the Y-MP design, each vector processor has a single pipeline for executing instructions. Each processor accesses common memory in a completely connected topology which leads to unavoidable collisions between processors attempting to access the same areas of memory. The Y-MP uses a collision avoidance system to minimize the collisions and clear up conflicts as quickly as possible. The conflict resolution system deactivates the processors involved and shuts down the vectors while the conflict is being resolved.

Although the above-mentioned multiprocessor vector supercomputing machines greatly increase processing speed and efficiency on large scale vector processing tasks, these machines cannot be run continuously without the occurrence of hardware failures. Therefore, periodic preventive maintenance ("PM") time is scheduled, during which the operating system is shut down and diagnostics are run on the machine in an effort to prevent hardware failures before they occur. PM time, while reducing the number of hardware failures which occur during run time of the operating system and associated user tasks, also decrease the amount of time the operating system can be up and running. Today many user processing tasks are so large that the user simply cannot afford any PM time. These users require that the system simply cannot go down. As a result, machines must be run until they break (i.e., a hardware failure occurs), and then the operating system down time must be reduced to a minimum. Those skilled in the art have therefore recognized the need for a computing system which minimizes shut down time such that the run time of the operating system can be maximized.

Another problem facing multiprocessing system designers is how to recover from a failure of a section of shared memory. If one of the processors of a multiprocessing system fails that processor can simply be shut down and the rest of the processors in the system can continue running user tasks with only a relatively small reduction in performance. However, problems are encountered when a processor is removed from the operating system. For example, any I/O attached to that processor is also unavailable to the operating system, and the entire multiprocessor system must be brought down, reconfigured, and the I/O is reassigned to the remaining processors such that all I/O is available to the operating system.

In addition, if a portion of the shared memory fails, shutting down a processor will not solve the problem because the remaining processors will continue to see the same memory errors. Previously, the only way to recover from a shared memory failure was to shut down the operating system and associated user tasks, and run diagnostics to isolate the failure. Once the failure was located, the machine was turned off completely, and the defective module replaced.

Although the above described method can effectively locate and repair failed hardware, it significantly reduces the time that the operating system is up and running. As stated previously herein, this is an undesirable result for many users whose processing tasks require almost continuous operation of their multiprocessor systems. Those skilled in the art have therefore recognized the need for a multiprocessor computing system which has a minimum amount of PM time, which can recover effectively from hardware failures on both the processor side and the shared memory side, all the while maximizing the time that the operating system is up and running.

SUMMARY OF THE INVENTION

To overcome limitations in the art described above and to overcome other limitations that will become apparent upon reading and understanding the present specification, the present invention provides multiprocessing vector computer system modes of operation which allow diagnostics to run on the machine while simultaneously allowing user tasks to run in a degraded mode of operation. In this manner, the diagnostics can isolate the problem without having to completely shut down the user tasks while at the same time protecting the integrity of the operating system. The system of the present invention therefore reduces PM time, shut down time, can recover effectively from hardware failures occurring on both the processor side and the memory side of multiprocessor systems, resulting in a corresponding increase in user task run time.

BRIEF DESCRIPTION OF THE DRAWINGS

In the drawings, where like numerals refer to like elements throughout the several views.

DETAILED DESCRIPTION OF THE PREFERRED EMBODIMENT

The present invention relates to methods for dividing a shared memory in a multiprocessor computing system wherein diagnostics can be run in one part of the memory while allowing the operating system (i.e., user tasks) to be run in the other part. In particular, the present invention provides two different but complementary modes of operating a multiprocessor computing machine to accomplish this objective; the "half memory" mode and the "upper 256K" mode.

An example of a CPU of the type of which the present invention is adapted to interface to a memory can be found in U.S. Pat. No. 4,661,900 to Chen et al., entitled "FLEXIBLE CHAINING IN A VECTOR PROCESSOR", which is incorporated herein by reference. The present invention is also related in design to the memory interface shown in U.S. Pat. No. 5,142,638, issued Aug. 25, 1992, and entitled "MEMORY CONFLICT RESOLUTION SYSTEM," the entire disclosure of which is incorporated herein by reference.

Figure 1:
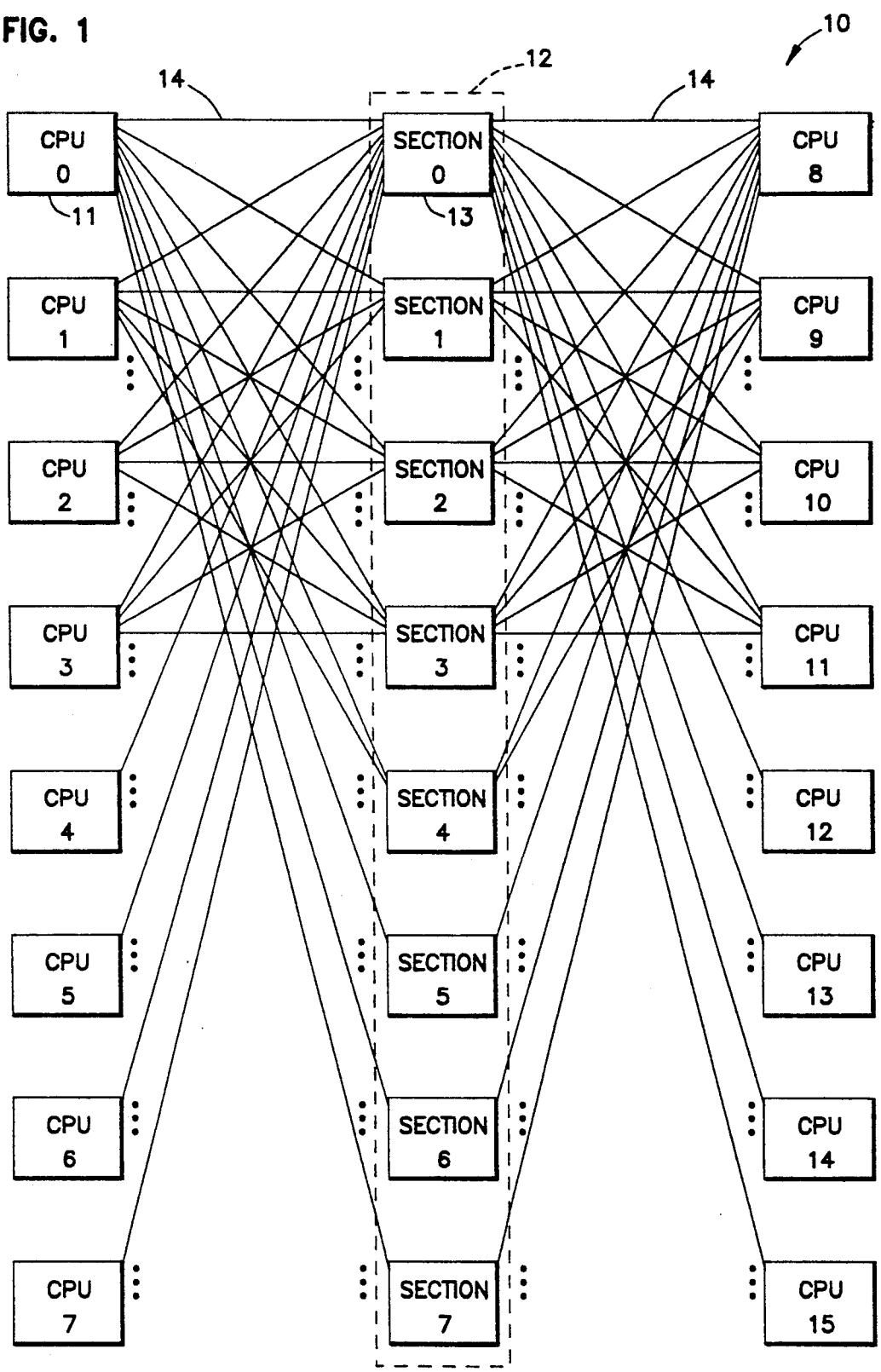
FIG. 1 is a simplified block diagram of the connection of the CPUs to memory in the multiprocessor system of the type used in the present invention.

As shown in FIG. 1, the present invention is specifically designed for a multiprocessor system 10 having sixteen CPU's 11. It shall be understood, however, that the principles of the invention can be applied to multiprocessor systems having a greater or lesser number of CPUs without departing from the scope of the present invention.

Memory 12 of system 10 is organized into eight memory sections 13. Each memory section 13 is further divided into eight subsections (not shown in FIG. 1), which are further divided into sixteen banks of memory (not shown in FIG. 1). Each of the CPUs 11 is connected to each memory section 13 through a memory path 14. The system 10 provides that one read or write reference can be made every clock period on each path 14, for a total of references per clock period.

In the preferred embodiment of the present invention, shared memory 12 is interleaved to reduce memory reference collisions between the processors. The interleaving results in consecutively numbered memory words being spread throughout the physical memory rather than physically located next to each other. When multiprocessor system 10 of the present invention is fully operational the interleaving maps out as follows:

| Word Number (Octal) | | | |
| --- | --- | --- | --- |
| Section 0: | 0 | 10 | 20 ... 1000 ... |
| Section 1: | 1 | 11 | 21 ... 1001 ... |
| Section 2: | 2 | 12 | 22 ... 1002 ... |
| Section 3: | 3 | 13 | 23 ... 1003 ... |
| Section 4: | 4 | 14 | 24 ... 1004 ... |
| Section 5: | 5 | 15 | 25 ... 1005 ... |
| Section 6: | 6 | 16 | 26 ... 1006 ... |
| Section 7: | 7 | 17 | 27 ... 1007 ... |

Thus if a word number's least significant digit is a "0", that word is physically located in Section 0, if a word's least significant digit is a "1" that word is physically located in Section 1, etc. Those skilled in the art will readily appreciate that this memory interleaving greatly reduces memory contention and blocking due to multiple processors referencing a single shared memory.

A more detailed description of the manner in which shared memory references are synchronized among the processors and how memory reference collisions between the processors are reduced and resolved can be found in the copending and commonly assigned U.S. Pat. No. 5,142,638, entitled "METHOD AND APPARATUS FOR SHARING MEMORY IN A MULTIPROCESSOR SYSTEM", to Schiffleger, issued Aug. 25, 1992, which is incorporated herein by reference.

HALF MEMORY MODE

In the half memory mode of the present invention, half of the eight memory sections are reserved for use by diagnostics while the operating system/user tasks are allowed to continue running in the other half. Each processor can be assigned to either half of memory to run diagnostics or user tasks independent of any other processors. Thus, the operating system might assign two processors to run diagnostics while the remaining processors run user tasks, or three processors on diagnostics, etc. Generally, this result is accomplished by bit shifting the appropriate bits in the memory address which restricts the operating system to one half of the memory and which remaps the entire memory into that half such that the memory space remains contiguous. This mode is especially suited to those hardware failures which the error patterns indicate are located in shared memory.

Referring again to FIG. 1, the operation of the half memory mode will be explained. As stated herein previously, each CPU 11 of system 10 is connected to each of the eight memory sections 13 through a memory path 14. Each path 14 consists of the following:

| | |
|---|---|
| 80 Bits | Write Data |
| 22 Bits | Chip Address & Chip Select (Bits 10–31 = 32 million word words) |
| 1 Bit | Write Reference |
| 1 Bit | Abort Reference (Address Range Error) |
| 3 Bits | Subsection (Bits 3–5) |
| 4 Bits | Bank (Bits 6–9) |
| 1 Bit | Go Section |
| 80 Bits | Read Data |
| 3 Bits | Subsection Read Select |

Each memory address is configured as follows:

| | Chip Address | Bank | Subsection | Section |
|---|---|---|---|---|
| Bits: | $\|2^{31}-2^{10}\|$ | $\|2^9 2^8 2^7 2^6\|$ | $\|2^5 2^4 2^3\|$ | $\|2^2 2^1 2^0\|$ |

In the preferred embodiment of the present invention, the memory sections are divided in terms of "upper" and "lower" memory. Those skilled in the art will readily recognize that if bit $2^2$ is a zero, the section reference will be to one of sections 0–3 (referred to as "lower" memory). Similarly, if bit $2^2$ is a one, the section reference will be to one of section 4–7 (referred to as "upper" memory). Thus the general manner in which the preferred embodiment of the present invention divides memory in half is by forcing bit $2^2$ to a 0 (if the failure is in the upper half of memory) or a 1 (if the failure is in the lower half of memory). In this manner all references from the operating system are rerouted to the "good" (i.e., failure free) half of memory. Diagnostics are run simultaneously on the failed half of memory in an effort to isolate the location of the hardware failure. Thus the half memory mode of the present invention allows the operating system/user tasks to be run in a degraded mode of performance in the good half of memory while diagnostics are run on the failed half, as opposed to prior art machines where it was necessary to completely shut down the operating system/user tasks to run diagnostics.

Figure 2:
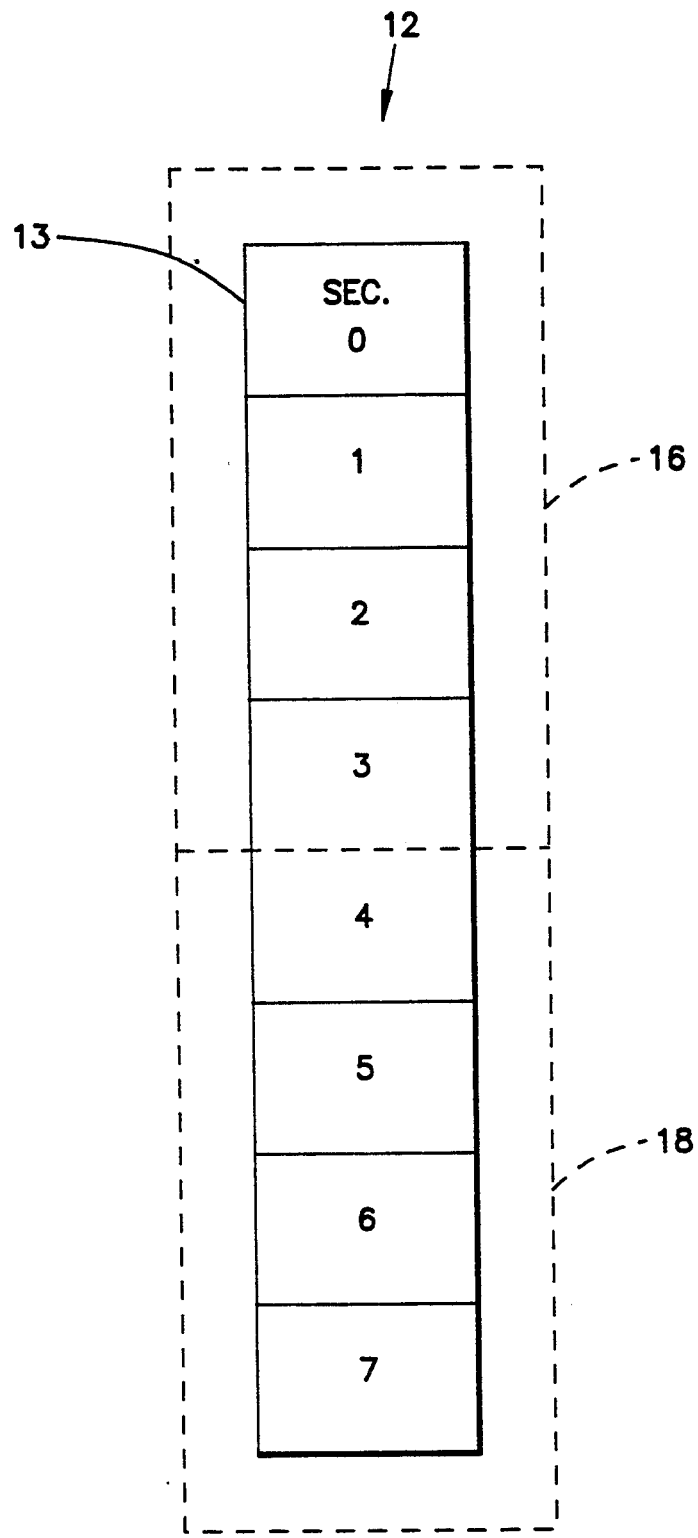
FIG. 2 is a simplified block diagram of the shared memory of the type used in the present invention showing the upper and lower halves of memory.

FIG. 2 shows a block diagram of memory 12 divided into lower memory 16 and upper memory 18. When half memory mode of the present invention is activated, it will be readily seen that the operating system immediately loses half of its former addressable memory space. Due to memory interleaving, the remaining memory locations will not be consecutively numbered. To assure proper operation of the multiprocessor system, memory 12 must remapped such that all locations exist and are contiguous. Thus, in addition to forcing bit $2^2$ to a zero or a one, the former value of bit $2^2$ is brought up further into the memory address to accomplish the address translation required for the memory remapping. In the preferred embodiment of the present invention, bit $2^2$ is brought up into and replaces bit $2^{21}$, while bits $2^{21}-2^{31}$ each shift up one bit position (where bit $2^{31}$ is lost "off the end"). This bit shifting scheme can be seen as follows: (where "bit value" is either 0 or 1):

bit position: $2^{31} 2^{30} \ldots 2^{23} 2^{22} 2^{21} 2^{20} 2^{19} \ldots 2^3 2^2 2^1 2^0$
bit value: $X_{31} X_{30} \ldots X_{23} X_{22} X_{21} X_{20} X_{19} \ldots X_3 X_2 X_1 X_0$ Resulting in the following remapped memory address:
bit position: $2^{31} 2^{30} \ldots 2^{23} 2^{22} 2^{21} 2^{20} 2^{19} \ldots 2^3 2^2 2^1 2^0$
bit value: $X_{30} X_{29} \ldots X_{22} X_{21} X_{20} X_{19} \ldots X_3 Y X_1 X_0$
where Y=0 {if failure occurred in upper memory} or Y=1 {if failure occurred in lower memory}

Thus, the memory addresses are now remapped such that section 4 word addresses physically exist in section 0, section 5 word addresses exist in section 1, etc. Thus, the location of words in the physical memory space in the half memory mode of the present invention is as follows (assuming a failure occurred in upper memory and therefore bit $2^2$ is forced to a 0 value):

| | Word (Octal) | | | | |
|---|---|---|---|---|---|
| Section 0: | 0 | 4 | 10 | 14 ... 1000 | 1004 ... |
| Section 1: | 1 | 5 | 11 | 15 ... 1001 | 1005 ... |
| Section 2: | 2 | 6 | 12 | 16 ... 1002 | 1006 ... |
| Section 3: | 3 | 7 | 13 | 17 ... 1003 | 1007 ... |
| Section 4: | | | Diagnostics - | | |
| Section 5: | | | nonexistent to | | |
| Section 6: | | | operating | | |
| Section 7: | | | system | | |

Those skilled in the art will readily recognize that a similar result would have occurred had the failure been in lower memory, in which case sections 0–3 would have been similarly remapped onto Sections 4–7, and diagnostics would be run in Sections 0–3.

Although some processing efficiency is lost due to the increased number of conflicts which occur with only half of the memory available, those skilled in the art will readily recognize that the bit shifting scheme of the present invention, wherein bits $2^3-2^{20}$ do not shift, offers a great hardware speed advantage over other bit translation schemes wherein all bits are shifted.

Although in the preferred embodiment of the present invention bit $2^2$ is brought up into bit $2^{21}$, those skilled in the art will readily appreciate that $2^2$ could replace any other suitable bit, as long as the bit chosen maps into the remaining addressable memory space after the half memory mode of the present invention is invoked.

Figure 3:
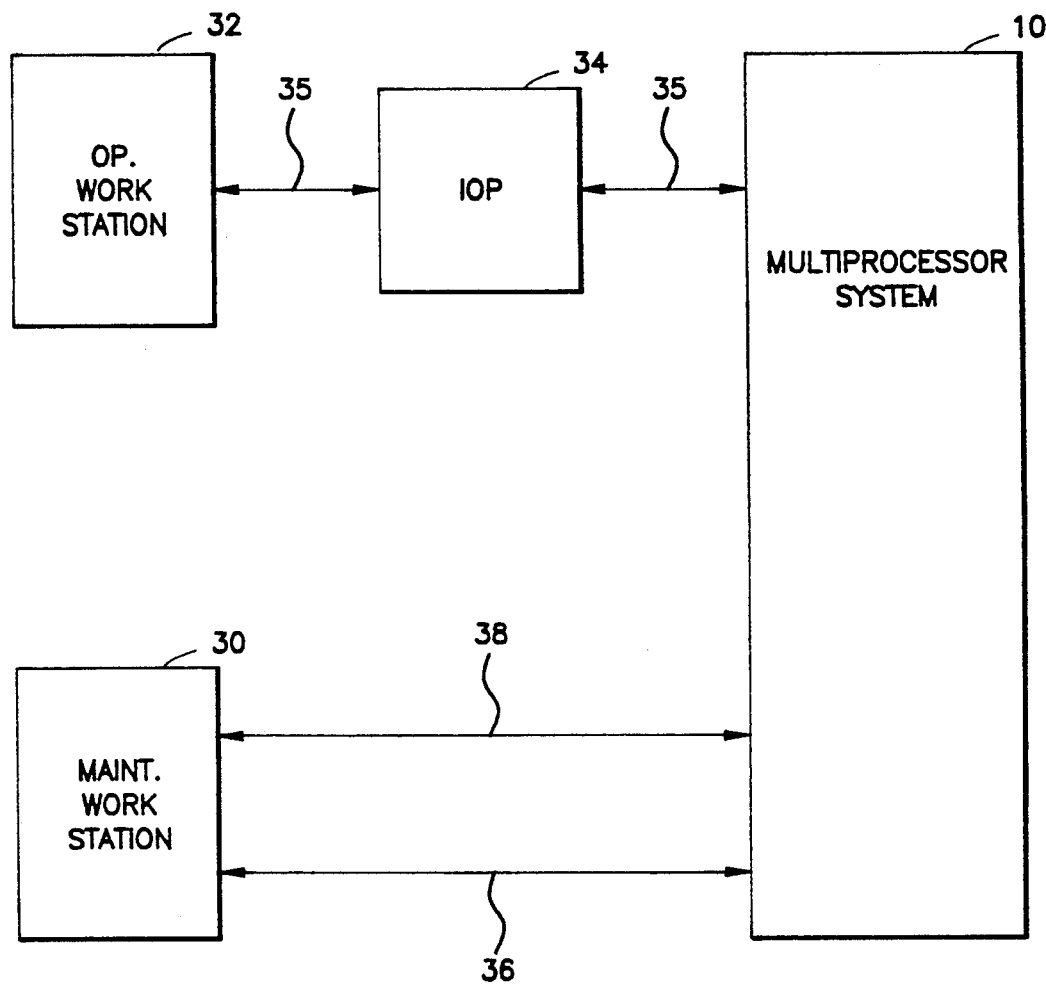
FIG. 3 is a block diagram of the multiprocessor system of the type used in the present invention connected to an operator workstation and a maintenance workstation.

FIG. 3 shows a block diagram of the multiprocessor system 10 of the present invention connected to a maintenance workstation 30 through a maintenance channel 36 and an error channel 38. System 10 is also connected through an Input/Output Processor (IOP) 34 to an operator's workstation 32. A more detailed description of the design and operation of IOP 34 can be found in U.S. patent application Ser. No. 07/390,722, to Robert J. Halford et al entitled "Modular I/O System for Supercomputers", filed Aug. 8, 1989, assigned to Cray Research, Inc., the assignee of the present invention, which is incorporated herein by reference.

Maintenance workstation 30 and operator workstation 32 are comprised of small VME-based workstations with color graphic CRT, disk drives, etc. Those skilled in the art will readily appreciate that any computer system could be substituted for the VME-based workstation described above. Generally, operator workstation 32 is used by system operators to run user task software on multiprocessor system 10. Maintenance workstation 30 is used by maintenance personnel for running diagnostics on system 10 when hardware failures occur. Essentially, operator workstation 32 can be thought of as the "software connection" into system 10 and maintenance workstation 30 can be thought of as the "hardware connection" into system 10.

When a memory failure occurs in memory 12 of system 10, system 10 sends error codes along error channel 38 to maintenance processor 30 to alert maintenance personnel that a portion of memory 12 has failed. Maintenance personnel then bring down system 10 and invoke the half memory mode of the present invention through maintenance processor 30. The maintenance personnel then re-dead start system 10 to get the system up and running. The maintenance personnel can also, through maintenance workstation 30, set which half of memory the operating system is to be restricted to, and can assign any number of processors in system 10 to run in the "good" half of memory working on user tasks, while the remaining number of processors can be assigned to simultaneously run diagnostics in the "bad" half of memory. The number of processors assigned to each half of memory is determined by maintenance personnel and is dependent upon the nature of the hardware failure that occurred.

Maintenance channel 36, in its simplest form, is comprised of and has the same capabilities as a standard lowspeed channel. In its most sophisticated form, maintenance channel 36 has the ability to read and write memory anywhere in system 10 without requiring the dead start/dump procedure typically required with a standard lowspeed channel. This form of maintenance channel 36 also has the ability to control switches on multiprocessor system 10. From maintenance workstation 30 through maintenance channel 36, then, the maintenance personnel can set the half memory mode of the present invention, force processors on and off, assign processors to certain halves of memory, view error codes on the maintenance workstation 30 CRT, etc., thereby allowing them to determine what and where the failure occurred.

Figure 4:
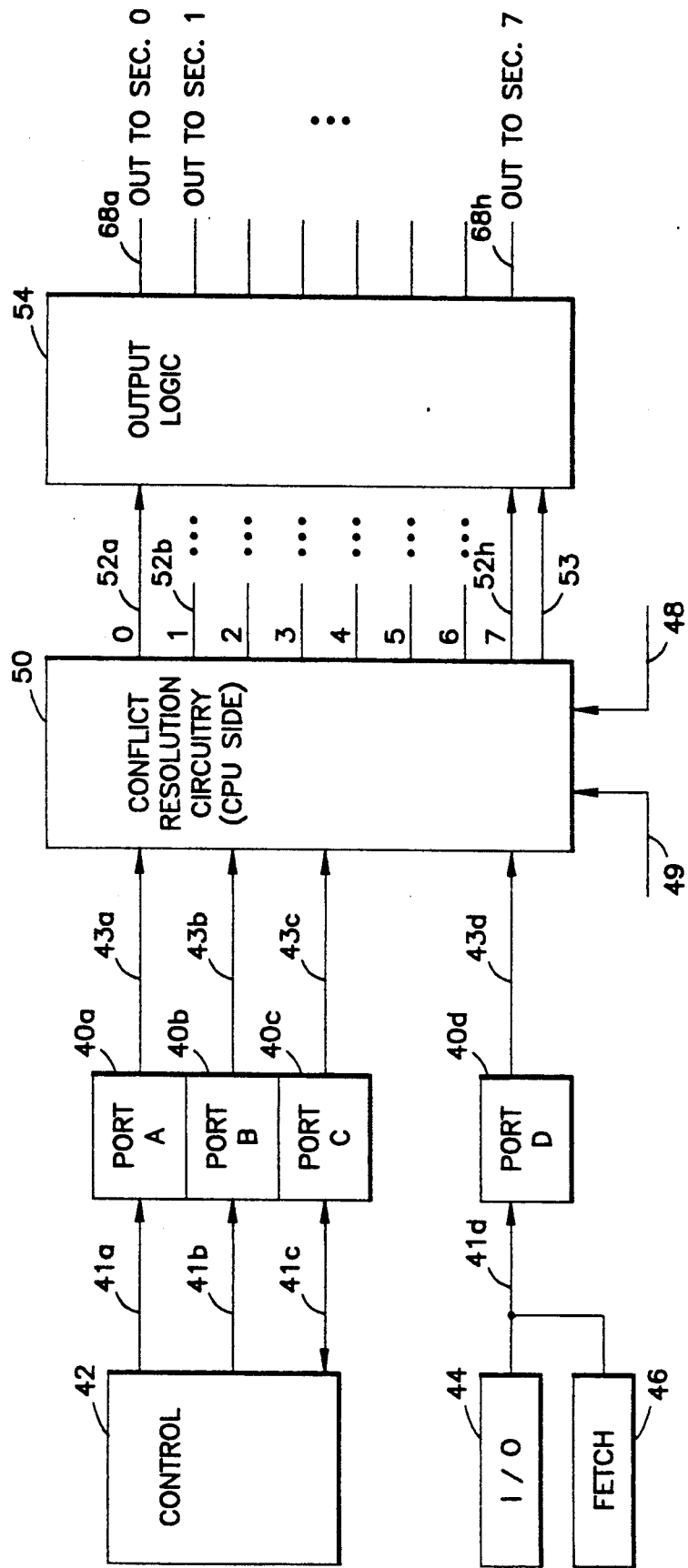
FIG. 4 shows a more detailed block diagram of a portion of a processor of the type used in the present invention.

FIG. 4 shows a block diagram of a portion of a processor of the type used in the present invention. Each processor in system 10 has four ports to common memory, port A 40a, port B 40b, port C 40c, and port D 40d. Ports A and B are read ports, port C is a write port, and port D is an I/O/fetch port. Control 42 contains all the registers and control circuitry necessary to set up ports A-C and is connected to ports A-C via lines 41a-c, respectively. I/O control 44 and fetch control 46 control port D 40d via line 41d. I/O control 44 and fetch control 46 share line 41d on a multiplexed conflict scheme wherein fetch control 46 has the highest priority.

Each port 40a-d is two words wide. Each port can therefore make two word references per clock period out of the processor for a total of eight references per clock period per processor. The processor of the type used with the present invention can therefore also be thought of as an eight port machine, wherein Port A includes references 0 and 1, Port B includes references 2 and 3, Port C includes references 4 and 5, and Port D includes references 6 and 7.

In the fully operational mode of multiprocessor system 10, outgoing port references travel along lines 43a-d to conflict resolution circuitry 50. Conflict resolution circuitry 50 has eight outputs 52 corresponding to the eight port references coming in along lines 43 (since each port is two words wide and there are four ports, a total of eight port references are possible on the output side of conflict resolution circuitry). Conflict resolution circuitry 50 is an interprocessor port reference arbitrator which resolves conflicts which occur when two references simultaneously attempt to access the same memory section.

Conflict resolution circuitry 50 also monitors subsection busy flags received from memory along connection 48. In the preferred embodiment of the present invention, since each of the eight memory sections is comprised of eight subsections, there are a total of 64 (8 times 8) subsections, each having one busy flag per processor. If a particular subsection busy flag is set, conflict resolution circuitry 50 will not allow a reference that subsection until the busy flag is turned off.

From address bits $2^0$-$2^2$, conflict resolution circuitry 50 generates a select code corresponding to which port reference wants access to which memory section. Circuitry 50 sends this select code along line 53 to output logic 54. Circuitry 50 also sends, for each port reference, 80 data bits and the remaining 29 address bits (bits $2^3$-$2^{31}$) along lines 52 to output logic 54. Output logic 54 contains crossbar circuitry for routing the port references coming in on lines 52 to the appropriate memory section output 68 according to the information contained in select code line 53.

When the half memory mode of the present invention is invoked from the maintenance workstation, conflict resolution circuitry 50 receives, along line 49, information about what mode the system is in, which half of memory went down, which half of memory the operating system is to be restricted to, etc. At this point, circuitry 50 knows that only four memory sections are available. Circuitry 50 takes this into account when generating the select code which it sends to output logic 54 along line 53. Circuitry 50 also alerts output logic 54 to perform the address translation described above.

Figure 5:
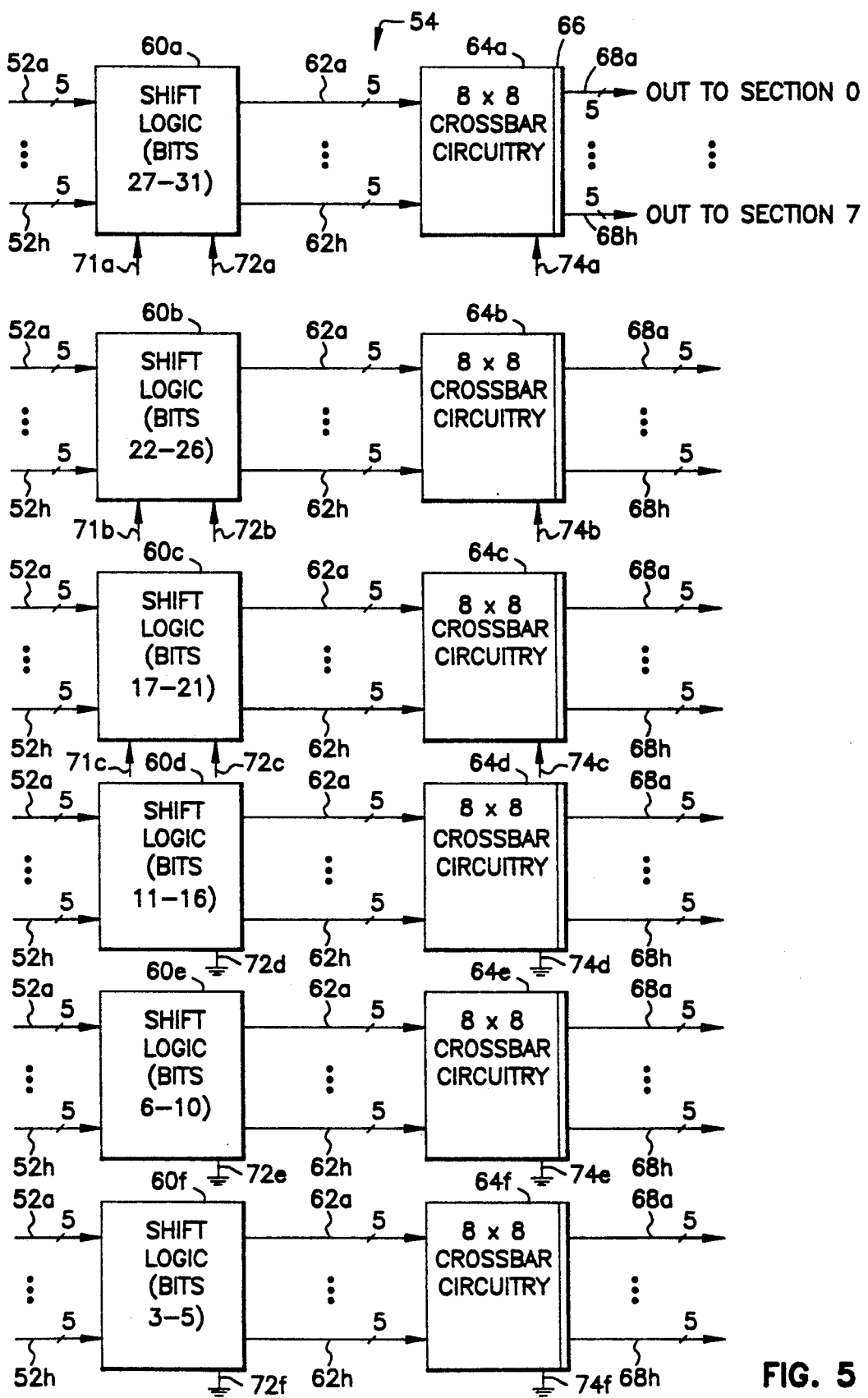
FIG. 5 is a more detailed block diagram of output logic shown in FIG. 4.

FIG. 5 is a more detailed block diagram of output logic 54. Output logic 54 performs the physical bit shifting for the address translation which was described above. Output logic 54 also contains the crossbar circuitry for routing port references to the appropriate memory section. Inside output logic 54, address bits $2^3$-$2^{31}$ are broken into five bit groups. Each five bit group is handled by a separate shift logic 60, except shift logic 60f, which handles only bits $2^3$-$2^5$. In the fully operational mode of the multiprocessor system, no address translation is necessary and therefore shift enables 72 on shift logic 60a-c are held at a logical low value. However, in the half memory mode of the present invention, address translation is required. Therefore, shift enable 72 is set to a logical high value so that shift logic 60a 9-C are enabled. Since the value of bit $2^2$ is placed into bit position $2^{21}$, and bits $2^{21}$-$2^{31}$ each shift up one bit position during the address translation of the half memory mode of the present invention, bit $2^2$ is fed into shift logic 60c on line 71c, bit $2^{21}$ is fed into shift logic 60b on line 71b, and bit $2^{26}$ is fed into shift logic 60a on line 71a. Shift logic 60a-c then perform the physical bit shifting for half memory mode address translation as described herein previously. Because bits $2^3$-$2^{20}$ do not shift, shift enables 72 for shift logic 60d-f are kept tied to a logical low level (ground). Those skilled in the art will recognize that shift logic 60c contains extra logic such that bits 17-20 do not shift.

In the preferred embodiment of the present invention, the translated addresses next travel along lines 62 to crossbar circuitry 64. Crossbar circuitry 64 routes for its five bit group, the port references to the appropriate output 68. Those skilled in the art will readily recognize and appreciate that output logic 54 need not be constructed precisely as described above. For example, in an alternate preferred embodiment of the present invention, crossbar circuitry 64 could precede shift logic 60 without departing from the scope of the present invention.

Finally, outputs 68a are loaded into the same line such that all bits of one address (bits $2^3$-$2^{31}$) are sent to common memory 12 on memory section output 68 (as shown in FIG. 4).

UPPER 256K MODE

The upper 256K mode of the present invention is especially designed for those hardware failures which occur internal to a processor or in processor dedicated logic. In this mode, the upper 256K words of memory are reserved for use by a single processor and diagnostics while the operating system/user tasks are allowed to continue running in the remaining portion of memory.

Figure 6:
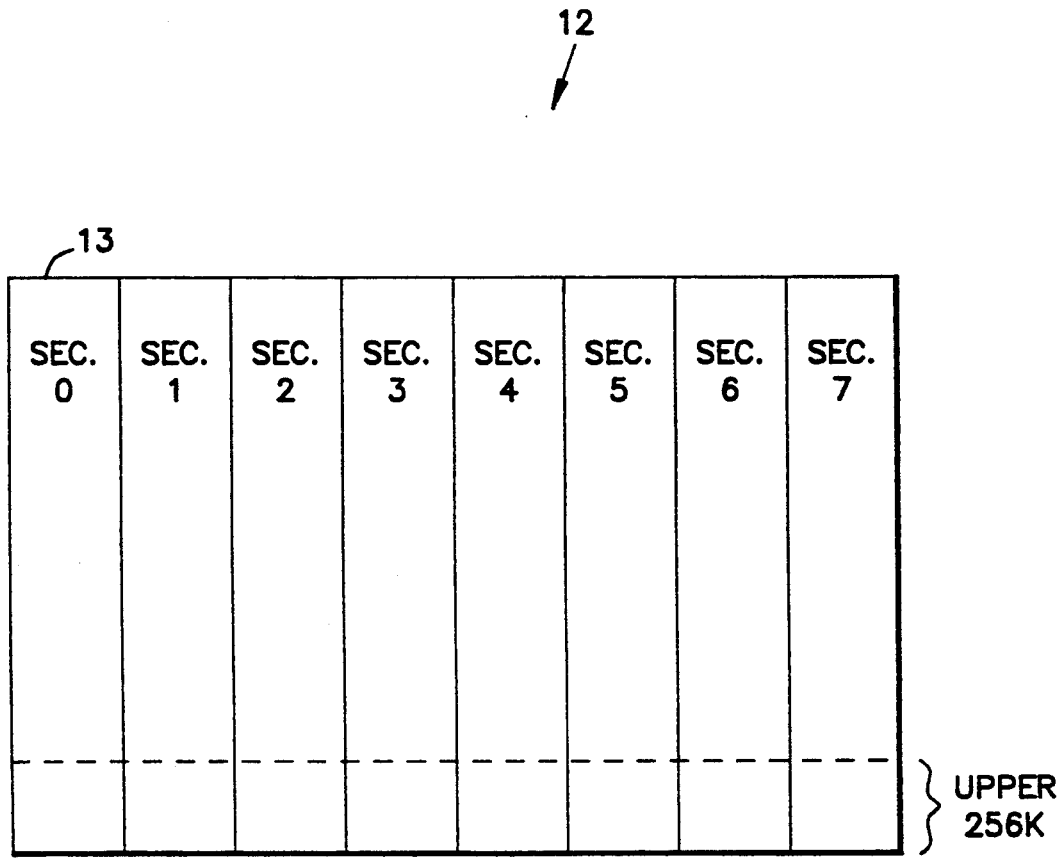
FIG. 6 is a simplified block diagram of the shared memory of the type used in the present invention showing the location of the upper 256K words of memory.

FIG. 6 shows a block diagram of shared memory 12 and its eight memory sections 13. Due to the memory interleaving utilized in multiprocessor system 10, the last 256K of addressable memory space is physically located in the area of memory indicated by phantom line 80. Those skilled in the art will recognize that this mode does not affect the memory interleaving, and that hence no remapping of memory addresses is required. The operating system need only be alerted that it has 256K words less on the upper side of memory in which to assign user tasks.

Those skilled in the art will readily recognize that one problem which occurs when a processor is removed from the operating system, is that the operating system no longer has access to that processor's I/O. For example, if the processor is connected to IOPs, high speed channels, etc those I/O functions are no longer available to the operating system. Thus, in the upper 256K mode of the present invention, two submodes are available to minimize these effects. The first of these two is the "CPU only" submode. This submode forces port A, B, C and port D fetch references to the upper 256K of memory, such that the operating system retains access to the I/O of the processor which was removed from the system. The second submode is the "CPU+I/O" submode. In this submode, when a processor is lost to the operating system the I/O associated with that processor is lost as well. Those skilled in the art will ready appreciate that which of these modes is invoked depends upon where the hardware failure may have occurred.

Referring again to FIG. 5, the "CPU+I/O" submode of the preferred embodiment of the present invention will be explained. When this submode is invoked through the maintenance processor, an associated signal is sent along lines 74a-c to crossbar circuitry 64. Crossbar circuitry 64 contains force logic 66 which, when enabled by lines 74a-c, forces all the corresponding bits for that crossbar circuit to a logical 1. Since the processor being taken away from the operating system is being forced into the upper 256K words of memory, bits 18-31 are forced to a logical 1. Thus, only crossbar circuitry 64a-c (which handle bits 18-31) can have its force logic 66 enabled in this manner. Cross bar circuitry 64c, in the preferred embodiment of the present invention, requires extra logic such that bit 17 does not get forced. Crossbar circuitry 64d-f, handling bits 3-16, have their corresponding force enables 74d-f tied to ground, since those bits are never forced. In the "CPU+I/O" submode of the preferred embodiment of the present invention, the upper bits 18-31 are forced irrespective of what port the reference came from.

In the "CPU only" submode of the preferred embodiment of the present invention, because port reference from ports A, B or C are simply read or write references and therefore do not require I/O access, bits 18-31 on ports A, B, and C are all forced to 1 in the same fashion as that described above for the "CPU+I/O" submode of the present invention.

In the "CPU only" submode of the present invention, to ensure that the I/O capabilities of the failed processor are available to the rest of the system, bits 18-31 port D are not forced to a logical 1 by circuitry 64a-c. Rather, they are forced by fetch control 46. In this manner, the I/O for the processor which was removed from the operating system is not forced into the upper 256K words of memory, and therefore the I/O to that processor is still available to the operating system. Those skilled in the art will readily recognize and appreciate that a great advantage of this scheme is that since the I/O is not removed, the entire multiprocessor system does not have to be reconfigured.

The following table is a summary of the upper 256K mode of the preferred embodiment of the present invention, which shows each of the eight ports and in which of the two submodes of the preferred embodiment of the present invention bits 18-21 are forced to a 1:

|      |   | Submode                              |                         |           |
| ---- | - | ------------------------------------ | ----------------------- | --------- |
| Port |   | CPU only (ports A, B, C, and port D fetch) | CPU only (port D I/O) | CPU + I/O |
| A:   | 0 | Y                                    |                         | Y         |
|      | 1 | Y                                    |                         | Y         |
| B:   | 2 | Y                                    |                         | Y         |
|      | 3 | Y                                    |                         | Y         |
| C:   | 4 | Y                                    |                         | Y         |
|      | 5 | Y                                    |                         | Y         |
| D:   | 6 | Y                                    | N                       | Y         |
|      | 7 | Y                                    | N                       | Y         | where
Y = forced to 1, and
N = not forced.

Although a specific embodiment has been illustrated and described herein, it will be appreciated by those of ordinary skill in the art that any arrangement which is calculated to achieve the same purpose may be substituted for the specific embodiment shown. For example, different address translation methods, different logic designs, or different multiprocessor systems could be used without departing from the scope of the present invention. This application is intended to cover any adaptations or variations of the present invention. Therefore, it is manifestly intended that this invention be limited only by the claims and the equivalents thereof.

What is claimed is:

1. A method of operating a multiprocessing system in a degraded performance mode while simultaneously running operating system and user programs and diagnostics, comprising the steps of:
   (a) detecting a hardware failure in a portion of memory shared by a plurality of processors;
   (b) determining an approximate location in the shared memory where a hardware failure occurred;
   (c) dividing the shared memory into a failed shared memory portion and a failure free shared memory portion;
   (d) determining a number of processors required to diagnose the hardware failure and assigning therefrom diagnostic processors and operating system processors;
   (e) translating memory reference addresses of the diagnostic processors to the failed shared memory portion;
   (f) translating memory reference addresses of the operating processors to the failure free shared memory portion;
   (g) running the diagnostics on the diagnostic processors on the failed shared memory portion; and
   (h) simultaneously running the operating system and user programs on the operating system processors in the failure free shared memory portion.

2. The method according to claim 1 wherein the failed shared memory portion is defined as one half of the shared memory, and the failure free shared memory portion is defined as the other half of the shared memory.

3. The method according to claim 2 wherein the two halves of memory are divided in terms of upper memory and lower memory.

4. The method according to claim 1, wherein an address is comprised of at least thirty two address bits $2^0$-$2^{31}$, and wherein each of the address bits has a corresponding value, wherein the translating (f) further comprises the steps of:
   (a) shifting address bits $2^{21}$ through $2^{31}$ up one address bit;
   (b) moving the value of bit $2^2$ into bit $2^{21}$; and
   (c) forcing the value of bit $2^2$ to a logical high value if the failed memory portion is contained in a first portion of memory, or to a logical low value if the failed memory portion is contained in a second portion of memory.

5. The method according to claim 1, wherein an address is comprised of n address bits $2^0$-$2^n$, including address bits $2^x$ and $2^y$, and wherein each address bit has a corresponding value, wherein the translating step (f) further comprises the steps of:
   (a) shifting address bits $2^x$ through $2^n$ up one address bit;
   (b) moving the value of address bit $2^y$ into address bit $2^x$; and
   (c) forcing the value of bit $2^y$ to a first value if the failed memory portion is contained in a first portion of memory, or to a second value if the failed memory portion is contained in a second portion of memory.

6. A multiprocessing computer system for simultaneously running operating programs and diagnostic programs, comprising;
   memory means including multiple sections of memory having interleaved addresses for storing data at specified memory reference addresses within a contiguous address space across all of said sections;
   processor means including a plurality of processors for executing instructions and for storing said data in said memory means;
   failure detection means connected to said memory means and said processor means for detecting a hardware failure in said memory means; and
   address translation means operable in response to said failure detection means for translating said memory reference addresses to a first portion of said memory means into memory reference addresses to a second portion of said memory means.

7. The multiprocessing computing system according to claim 6 further including a maintenance workstation through which an operator may control said address translation means to translate 1) all memory reference addresses sent from at least one of said plurality of processors to all of said sections of memory into 2) memory reference addresses sent only to a subset of all of said sections of memory of said memory means such that the memory address space remains contiguous.

8. The multiprocessing computer system according to claim 6 wherein said address translation means further includes means for forcing at least one of the address bits of said memory reference address which corresponds to said first portion of said memory means to a value which corresponds to said second portion of said memory means.

9. The multiprocessing computer system according to claim 8 wherein said address translation means further includes shift logic means for shifting at least a portion of the address bits of said memory reference address which correspond to said contiguous address space across all of said sections of said memory means to cause the address bits of said memory reference address to correspond to a contiguous address space across a portion of said sections of said memory means.

10. The multiprocessing computing system according to claim 9 wherein said first portion of said memory means and said second portion of said memory means each comprise one half of said memory means.

11. A multiprocessing computer system for simultaneously running operating programs and diagnostic programs, comprising:
   memory means including multiple sections of memory having interleaved addresses for storing data at specified memory reference addresses within a contiguous address space across all of said sections;
   processor means including a plurality of central processors for executing instructions and for storing said data in said memory means;
   address control means for outputting said memory reference addresses; and
   maintenance workstation means through which an operator may control said address control means to force at least one of the address bits of all of said memory reference addresses from a selected central processor to a fixed value to force said selected central processor to access only a selected portion of all of said sections of said memory means.

12. The multiprocessing computer system according to claim 11 further including:
   I/O means including a plurality of I/O processors for interfacing between peripherals and said memory means and for storing said data in said memory means, each of said I/O processors being associated with one of said central processors;
   said address control means further including a plurality of first ports between each of said central processors of said processor means and said memory means, further including a plurality of second ports between each of said I/O processors of said I/O means and said memory means;
   said address control means further operable in response to said maintenance workstation means for forcing at least one of the address bits of all of said memory reference addresses from a selected central processor through a selected first port to a fixed value thereby forcing said selected central processor to access only a selected portion of all of said sections of said memory means; and
   said address control means further operable in response to said maintenance workstation means for simultaneously not forcing any of the address bits of all of said memory reference addresses from a selected I/O processor through a selected second port to a fixed value thereby allowing said selected I/O processor to access all of said sections of said memory means.

13. The multiprocessing computer system according to claim 11 further including:
   I/O means including a plurality of I/O processors for interfacing between peripherals and said memory means and for storing said data in said memory means, each of said I/O processors being associated with one of said central processors;
   said address control means further including a plurality of first ports between each of said central processors of said processor means and said memory means, further including a plurality of second ports between each of said I/O processors of said I/O means and said memory means;
   said address control means further operable in response to said maintenance workstation means for forcing at least one of the address bits of all of said memory reference addresses from a selected central processor through a selected first port to a fixed value thereby forcing said selected central processor to access only a selected portion of all of said sections of said memory means; and
   said address control means further operable in response to said maintenance workstation means for simultaneously forcing at least one of the address bits of all of said memory reference addresses from a selected I/O processor through a selected second port to a fixed value thereby forcing said selected I/O processor to access only a selected portion of all of said sections of said memory means.

* * * * *